United States Patent [19]

Welch et al.

[11] 4,381,659
[45] May 3, 1983

[54] METHOD OF MANUFACTURING UNIVERSAL JOINT HOUSING

[75] Inventors: Mack D. Welch, Bridgeport; William B. Speer, Frankenmuth, both of Mich.

[73] Assignee: General Motors Corporation, Detroit, Mich.

[21] Appl. No.: 232,905

[22] Filed: Feb. 9, 1981

[51] Int. Cl.³ .............................................. B21K 21/08
[52] U.S. Cl. ....................................... 72/340; 72/367; 72/370; 464/111
[58] Field of Search ................. 29/148.4 C; 308/6 C; 72/340, 367, 370, 402; 464/111

[56] References Cited

U.S. PATENT DOCUMENTS

| 2,352,776 | 7/1944 | Dodge | 64/21 |
|---|---|---|---|
| 3,568,494 | 3/1971 | Geisman | 72/402 |
| 3,613,396 | 10/1971 | Drevard et al. | 64/21 |
| 3,656,318 | 4/1972 | Smith et al. | 64/21 |
| 3,688,521 | 9/1972 | Smith et al. | 64/21 |
| 3,696,638 | 10/1972 | Smith et al. | 64/21 |
| 3,788,098 | 1/1974 | Miller et al. | 64/11 R |
| 3,792,596 | 2/1974 | Orain | 64/21 |
| 3,817,057 | 6/1974 | Orain | 64/32 F |
| 3,822,570 | 7/1974 | Fisher | 64/32 R |
| 4,120,176 | 10/1978 | Ebbinghaus | 64/21 |
| 4,154,082 | 5/1979 | Beech | 72/370 |
| 4,294,100 | 10/1981 | Olschewski | 72/340 |

FOREIGN PATENT DOCUMENTS

| 49-10430 | 3/1974 | Japan | 72/402 |
|---|---|---|---|
| 2026105 | 1/1980 | United Kingdom | 29/148.4 C |

Primary Examiner—Lowell A. Larson
Attorney, Agent, or Firm—F. J. Fodale

[57] ABSTRACT

A housing for a tri-pot universal joint is manufactured from a tube blank which is cold formed in a two-step indenting process. The indenting process forms the middle of the tube into a tri-lobal section for broaching internal drive tracks while leaving the end portions sufficiently intact to provide circular bands at each end by subsequent machining operations. A closure is attached to the band at one end and the band at the other end is used to mount a conventional boot. A machine having a cam die arrangement suitable for indenting the tube blank is also disclosed.

4 Claims, 13 Drawing Figures

METHOD OF MANUFACTURING UNIVERSAL JOINT HOUSING

This invention relates generally to universal joints and, more particularly, to a method of manufacturing a housing for a tri-pot universal joint.

In the past, housings for tri-pot universal joints have been made from a cast steel blank approximately the shape of the housing, which is then machined to final shape and dimensions.

Cast steel blanks are relatively expensive and have several drawbacks from a manufacturing standpoint. For instance, imprecise core alignment during the casting process, produces cast blanks which are not consistent in concentricity or cross-section. Thus, methods using cast steel blanks require considerable machining and often result in housings which vary in hardness after heat treatment and/or are slightly out of balance dynamically. Other problems are porosity of the cast steel blanks and wash out of surfaces during casting which makes it difficult to locate and fixture the cast steel blank for machining operations.

In the method according to our invention, the housing is manufactured from a cut-off length of commercially available tube which is considerably cheaper than a cast steel blank. The tube is cold formed by an indenting process which produces housing blanks which are more consistent and symmetrical than the cast steel blanks. These housing blanks can be machined to tight concentricity requirements and consistent cross-sections with considerably less scrap loss. The housing blanks and housings made therefrom are easier to heat treat with consistent results and also have a better dynamic balance.

It is also known from U.S. Pat. No. 3,792,596 granted to Michel Orain on Feb. 19, 1974 to provide a tri-pot universal joint in which the outer drive member is a shell 4 as shown in FIGS. 1-4. According to the Orain specification, the general form of the shell 4 is approximately that of a cylinder so as to allow for economic production of the coupling from drawn or spun tube. Column 2, lines 44-47.

The shell 4, which is disclosed in the Orain patent, is thin and has a tri-lobal shape throughout its entire length which provides three internal drive tracks 5 for three drive rollers 1 forming part of the inner drive member.

In automotive drive line applications, it is necessary to have a substantial torque capacity, to seal the universal joint and to provide an attachment for mechanically connecting the housing or outer drive member to a drive line component such as an axle shaft, differential or transmission.

The Orain shell 4, because of being thin and being formed with a tri-lobal section throughout its entire length, is not very suitable for a universal joint for an automotive drive line application which requires the features noted above. See for instance, the two embodiments shown respectively in FIGS. 8 and 9 and FIGS. 11 and 12 of the Orain patent which may address one or more of the torque capacity, sealing or attachment problems but which do not provide any practical solutions.

The object of this invention is to provide a method for making a tri-pot universal joint housing from a length of tube which has a substantial torque capacity, which is easy to seal and which facilitates incorporation of an attachment for mechanically connecting the housing to a shaft, a differential or a transmission.

An important feature of the invention is that the middle of the tube is formed into a tri-lobal section for providing the internal ball tracks while the end portions of the tube are left sufficiently intact so that circular bands can be machined at each end for securing a closure and attachment piece at one end of the housing and a conventional sealing boot at the other end of the housing.

Other objects and features of the invention will become apparent to those skilled in the art as the disclosure is made in the following detailed description of a preferred embodiment of the invention as illustrated in the accompanying sheets of drawing in which.

Figure 1:
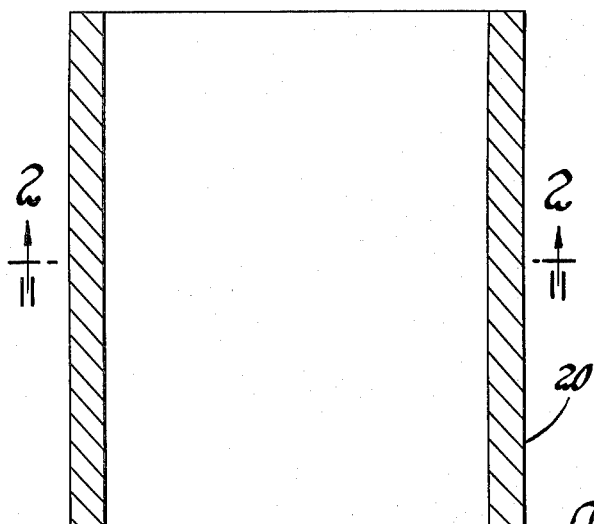
FIG. 1 is a longitudinal section of a tube blank used for manufacturing a tri-pot universal joint housing in accordance with our invention.
Figure 2:
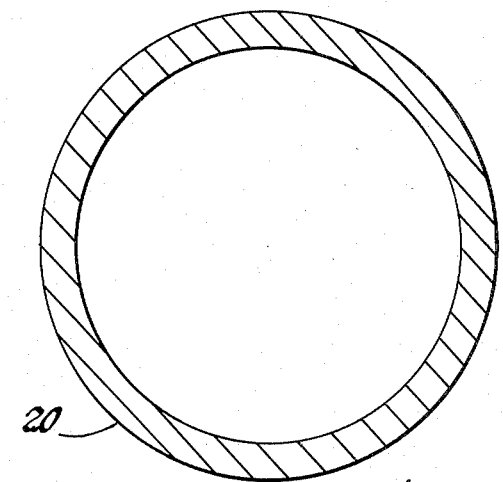
FIG. 2 is a cross-section of the tube blank shown in FIG. 1.

Referring now to the drawings, our method of manufacturing a tri-pot housing starts with a relatively inexpensive predetermined length of butt welded, mechanically drawn and reduced tube or tube blank 20. Several tube blanks 20 may be conveniently provided by sequentially cutting the appropriate length from the end of commercially available tubing by procedures well-known in the art.

The tube blanks 20 have a sufficient wall thickness so that the tri-pot housing ultimately formed therefrom is itself strong enough to sustain the loads encountered by a tri-pot universal joint in an automotive drive line application. By way of example, we have formed a tri-pot housing for a tri-pot universal joint rated at a torque capacity of 24,000 inch pounds from a tube blank having a 4.00 inch outer diameter and a wall thickness of 0.315 inches.

The tube blank 20, consequently, may be described as a thick walled tube since it is at the upper end of the range of butt welded, mechanically drawn and reduced tubing which is commercially available and marketed on the basis the ratio of the wall thickness to the outer diameter. At present, such tubing is available from Loan Star Steel in Texas and the Copper Weld Division of Ohio Tubing.

Figure 3:
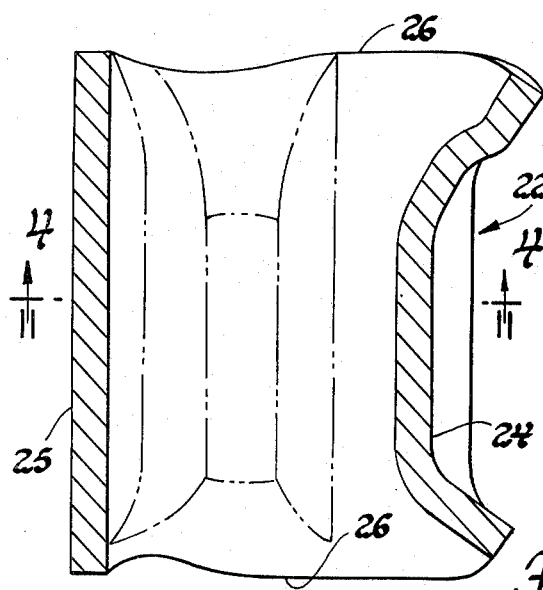
FIG. 3 is a longitudinal section of the tube blank after indenting.
Figure 4:
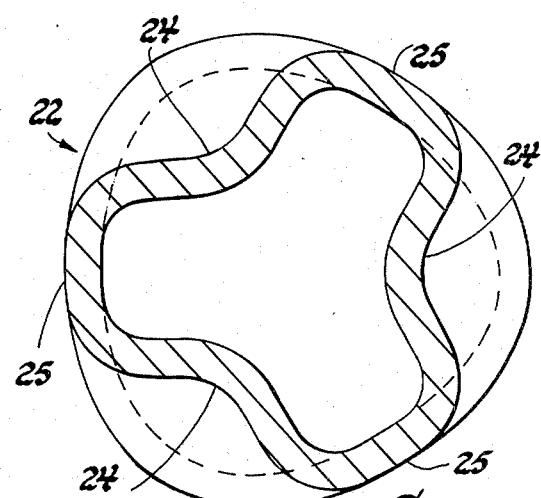
FIG. 4 is a cross-section of the indented tube shown in FIG. 3.
Figure 12:
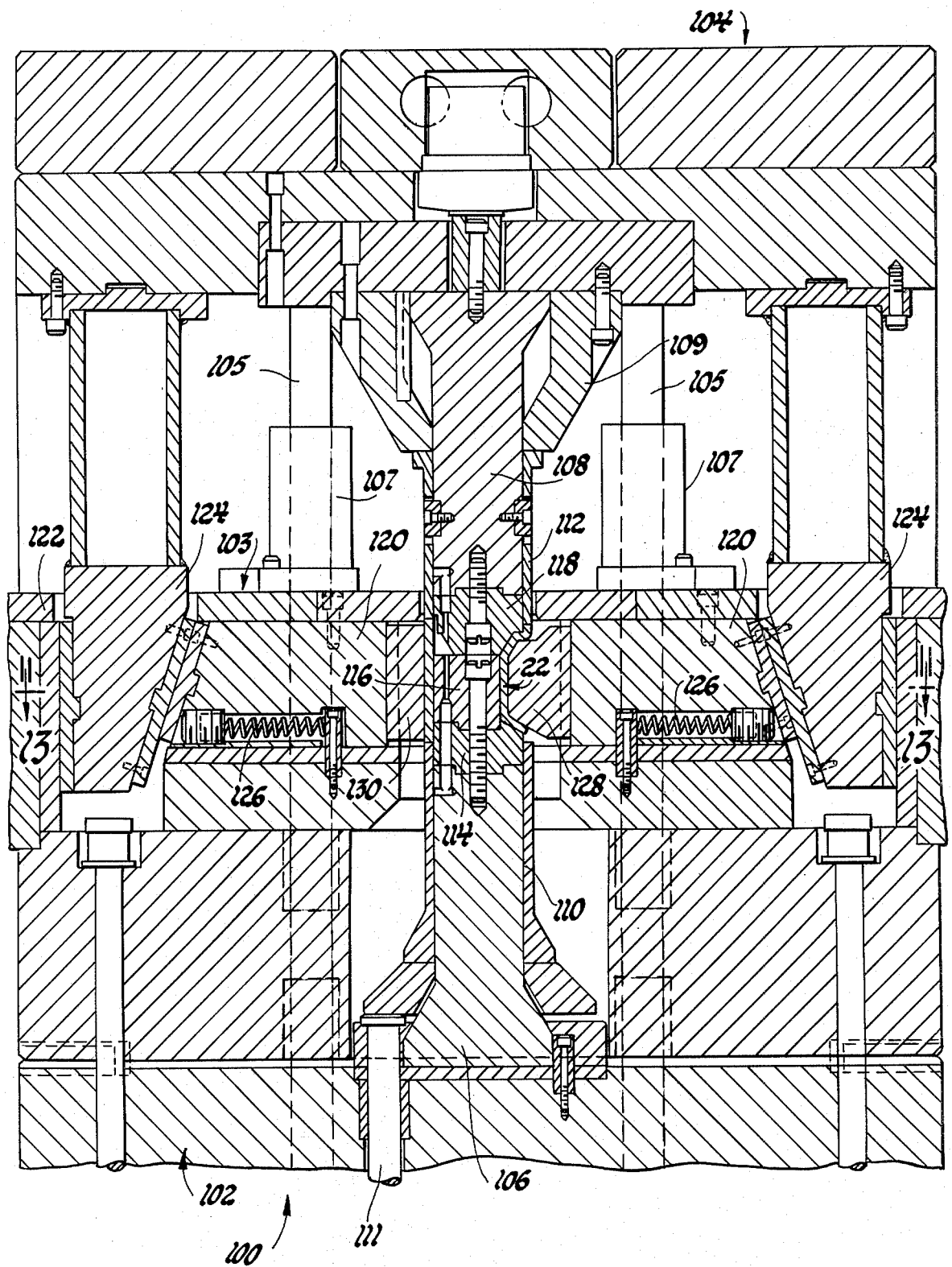
FIG. 12 is a vertical section of a machine having cam type dies for forming the indented tube shown in FIGS. 3 and 4.
Figure 13:
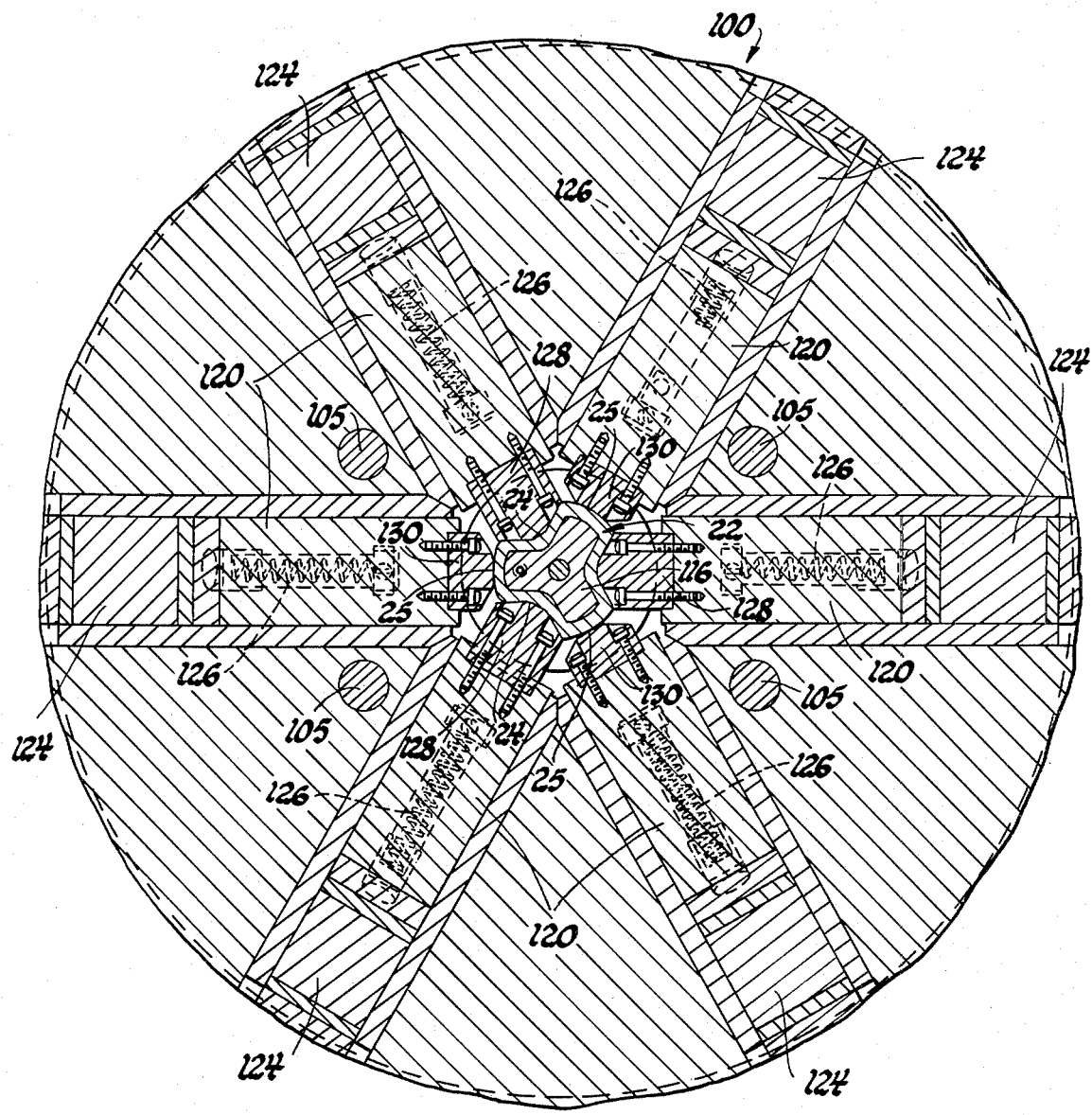
FIG. 13 is a sectional view of the machine taken substantially along the line 13—13 of FIG. 12 looking in the direction of the arrows.

The thick walled tube 20 is fully annealed in a conventional manner and then cold formed to the shape shown in FIGS. 3 and 4 wherein the middle portion of the cold formed tube 22 has a tri-lobal section as shown in FIG. 4. The cold forming operation, which may be described as an indenting operation, may be carried out in a machine with a cam-type die arrangement as shown in FIGS. 12 and 13, which will be described in greater detail later. Briefly, the cold formed or indented tube 22 is formed in a two stage operation by six radial cams equally spaced about the perimeter of the tube blank 20 which is located about a central mandrel. Three of the cams are spaced 120° apart and carry convex forming tools which engage the outer diameter of the middle portion of the tube blank 20, first centering the tube blank 20 and then pushing it inwardly at three circumferentially spaced locations to partially form the indents 24. The other three cams carry flat nosed forming tools. These flat nosed forming tools engage the outer diameter of the partially formed tube at the lands 25 which are halfway between the indents 24 when the cams carrying the convex forming tools are near the end of their forming stroke. As the convex forming tools continue inwardly to complete the indents 24, the flat nosed tools simultaneously push nearly the entire length of the three lands 25 inwardly until the tube blank 20 conforms to the shape of the central mandrel.

As a result of this two stage cold forming operation, the lands 25 are circumscribed by an imaginary cylinder which has an outer diameter which is reduced by about 3% in comparison to the outer diameter of the tube blank 20, however, the wall thickness remains substantially unchanged and constant throughout the indented tube 22. The end portions of the indented tube 22 are irregular as the end portions in alignment with the indents 24 take on a bell mouth shape resulting in corrugated end faces as shown in FIG. 3 particularly. Even though the end portions are irregular, they remain intact and have enough material to provide machined circular bands at each end of sufficient strength for their intended purpose which is described later.

An important feature of the cold forming operation is that the three equidistant lands 25 remain straight or linear in section and retain square end faces so that the indented tube 22 has three flat coplanar surfaces 26 at each end face. The straight lands 25 and the flat surfaces 26 provide reference surface for accurately locating the indented tube 22 in subsequent machining operations.

Figure 5:
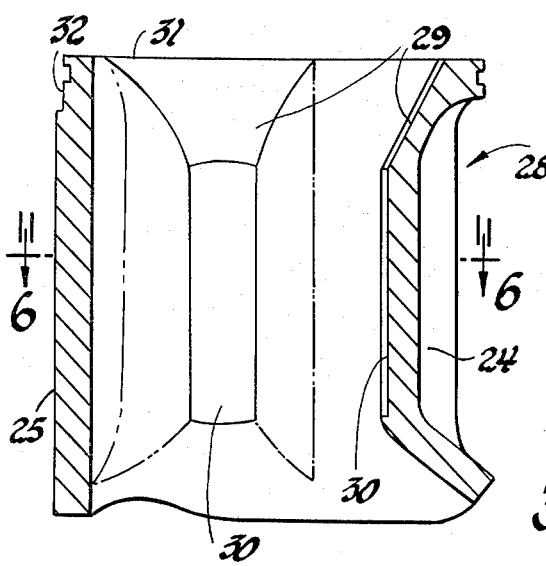
FIG. 5 is a longitudinal section of a partially machined part made from the idented tube shown in FIGS. 3 and 4.
Figure 6:
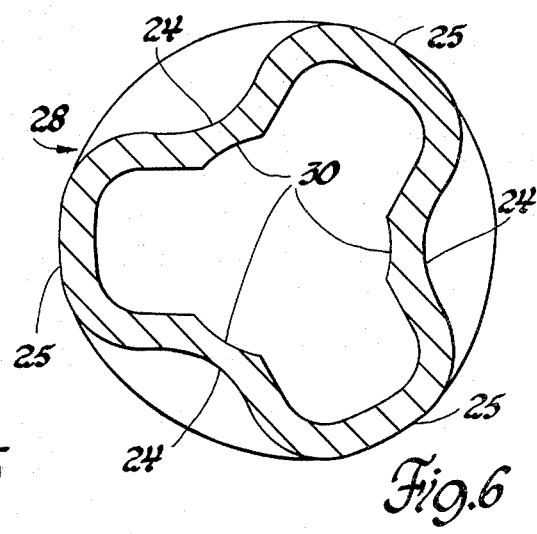
FIG. 6 is a cross-section of the partially machined part shown in FIG. 5.

After being stress relieved in a conventional manner, the indented tube 22 is then clamped in a vertical lathe using the straight lands 25 and lower flat surfaces 26 for reference and machined to produce the partially machined part 28 shown in FIGS. 5 and 6. In this first series of machining operations, the inside of the indented tube 22 is bored from one end (the upper end shown in FIGS. 3, 4, 5, and 6) to form conical surfaces 29 on the inside of the upper bell mouthed end portions aligned with the indents 24 and concentric part cylindrical surfaces 30 on the inside of the indents 24; the upper corrugated end face of the indented tube 22 is faced off to provide a flat annular end face 31; and the upper end of the indented tube 22 is turned on the outer surface to provide an outer notched circular band 32 for securing a conventional rubber or rubber-like boot. The turning operation also finishes a small portion of the lands 25.

Figure 7:
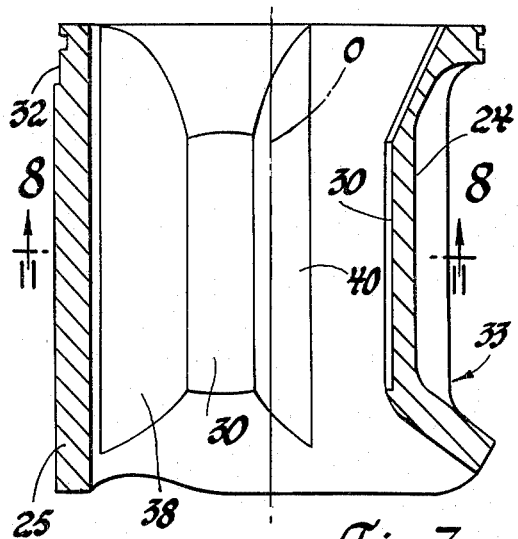
FIG. 7 is a longitudinal section of a broached part made from the partially machined part shown in FIGS. 5 and 6.
Figure 8:
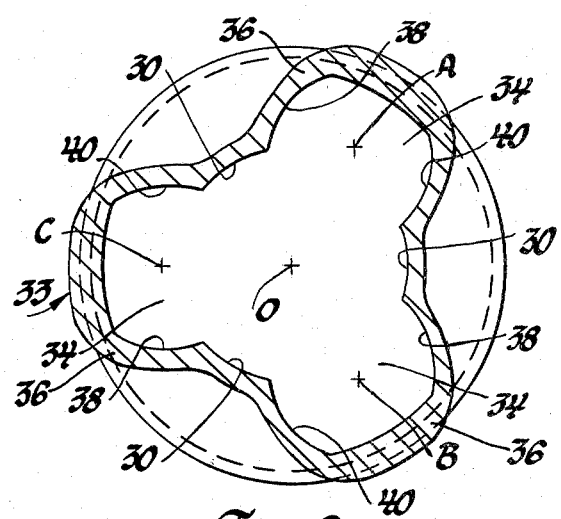
FIG. 8 is a cross-section of the broached part shown in FIG. 7.

The partially machined part 28 is then broached in two passes—a rough broach and a finish broach—to produce the broached part 33 shown in FIGS. 7 and 8. The broaching operation produces three internal drive tracks 34 inside the lobes 36 formed by the indents 24 and the lands 25. The drive tracks 34 in the broached part 33 are characteristic of those needed for a tri-pot universal joint. That is, the drive tracks 34 are relatively deep and have curved pairs of side walls 38,40 which establish centerlines A, B and C spaced equal distances from the longitudinal axis O and which extend radially inwardly of these centerlines sufficiently to capture curved drive rollers in the drive tracks 34. The part cylindrical surfaces 30 on the inside of the indents 24 are also enlarged during the broaching operation.

Figure 9:
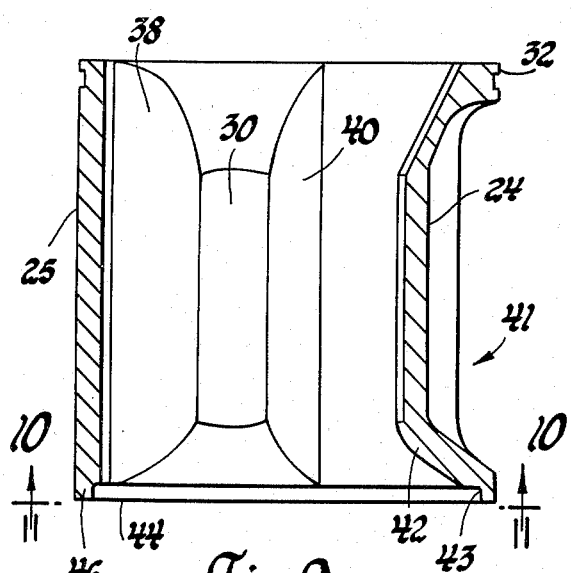
FIG. 9 is a longitudinal section of a housing part machined from the broached part shown in FIGS. 7 and 8.
Figure 10:
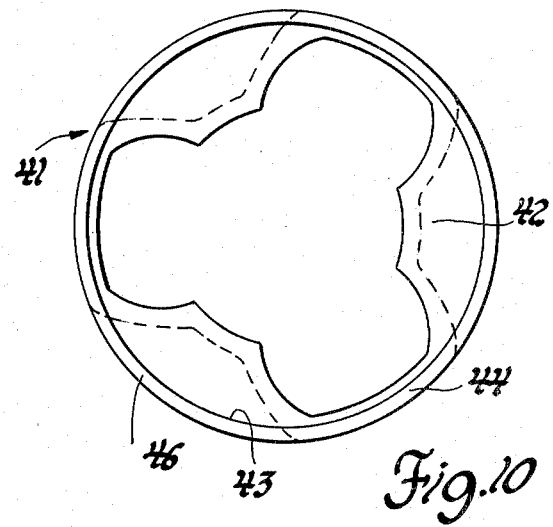
FIG. 10 is an end view of the housing part shown in FIG. 9.

The broached part 33 is then machined in a vertical lathe to produce the housing part 41 shown in FIGS. 9 and 10. In this final series of machining operations, the opposite end of the broached part 33 (the lower end shown in FIGS. 7, 8, 9 and 10) is bored to form conical surfaces 42 on the lower bell-mouthed end portions aligned with the indents 24 and a counter bore 43 at the lower end; the corrugated lower end face of the broached part 33 is faced off to provide a flat annular end face 44 and the broached part 33 is turned on the outer surface. This series of machining operations provides an axial circular lip or band 46 at the lower end of the housing part 41. The turning operation also finishes the unfinished portions of the lands 25 so that the outer surfaces of the three lands 25 are congruent with the outer surface of the circular bands 32 and 46 at each end of the housing part 41.

After being washed, the housing part 41 is then hardened, preferably by an induction hardening method.

Figure 11:
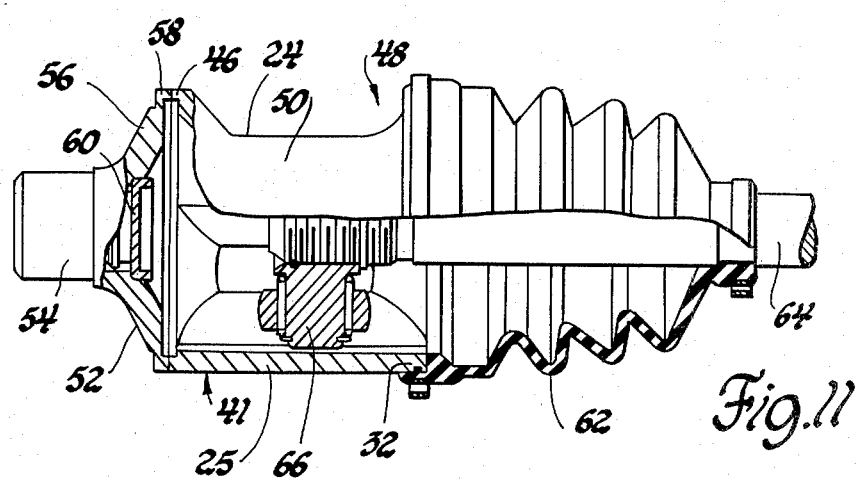
FIG. 11 is a longitudinal section of a tri-pot universal joint having a housing comprising the housing part shown in FIGS. 9 and 10.

FIG. 11 shows a tri-pot universal joint 48 having a housing 50 which is made from the housing part 41 and an attachment piece 52 of more or less conventional design. The particular attachment piece 52 comprises an internally splined collar portion 54 which attaches to a shaft (not shown), a flange portion 56 at one end of the collar portion 54 and an axial circular lip 58 at the outer periphery of the flange portion 56.

The attachment piece 52 is spin-welded to the housing part 41 by conventional techniques which fuse and bond axial circular lips 46 and 58 together.

The spin-welded attachment piece 52 closes one end of the housing 50 and provides an attachment for mechanically connecting the housing to an axle shaft or other drive line component. While a female attachment piece 52 is illustrated, other attachment pieces, such as a male attachment piece having an externally splined stub shaft rather than an internally splined collar, can obviously be utilized. If it is necessary to completely seal the closed end of the housing, the splined bore of the collar portion 54 can simply be plugged by a sheet metal insert 60 or the like.

As shown in FIG. 11, the open end of the housing 50 is simply sealed by a conventional rubber or rubber-like boot 62 which has a large end clamped onto the notched circular band 32 of the housing part 41. The small end of the boot 62 is clamped around the drive shaft 64 for the inner drive member 66 of the universal joint 48 in more or less conventional manner.

A machine 100 having a cam-type die arrangement suitable for cold forming the thick walled tube blank 20 into the indented tube 22 is shown in FIGS. 12 and 13.

The machine 100 is a double action press which has a fixed bed 102, an outer ram 104 and an inner ram 108 which is coaxial with a fixed post 106 attached to the bed 102. A cam die assembly 103 is secured to the top of the bed and the outer ram 104 has attached vertical rods 105 which slide in bearings 107 attached to the top of the cam die assembly 103 and bearings in the bed 102 which are shown in dashed lines. During the down stroke, the rods 105 engage and depress a cushion plate (not shown) below the bed 102. The inner ram 108 slides in a guide 109 attached to the outer ram 104.

The fixed post 106 is surrounded by an ejector sleeve 110 which is operated by a push pin 111 attached to the cushion plate (not shown) below the bed 102. The inner ram 108 is surrounded by a clamp sleeve 112 which is operated by the guide 109.

The press is equipped with a three piece forming mandrel comprising a lower die 114, a middle die 116, and an upper die 118. The lower and middle dies 114 and 116 are secured to the end of the fixed post 106 attached to the bed 102. The upper die 118 is secured to the end of the inner ram 108.

The lower and middle dies 114 and 116 are shaped for forming the interior of the lower middle portion of the indented tube 22 which is also shown in FIGS. 3 and 4. As shown in FIG. 13, the middle die 116 has a tri-lobal cross-section which matches the interior of the tri-lobal section of the indented tube 22. The upper die 118 is shaped for forming the interior of the upper end portion of the indented tube 22.

The cam die assembly 103 has six horizontally, slideable cams 120 which are radially arrayed around the axis of the fixed post 106 on centerlines which are 60° apart. See FIG. 13. The cams 120 are operated by six cam drivers 124 which depend from the outer ram 104 and engage the outer ends of the cams 120. The cam drivers 124 also serve as guides for the outer ram 104. The cams 120 are biased against the cam drivers 124 by return springs 126 operatively connected to the cams 120 and fixed portions of the cam die assembly 103.

Three cams 120 spaced 120° apart have convex forming tools 128 attached to their inner ends. The convex forming tools 128 are shaped to form the indents 24 in cooperation with the three piece forming mandrel comprising dies 114, 116 and 118. The other three cams have flat nosed forming tools 130 attached to their inner ends. The flat nosed forming tools engage the lands 25 and push them radially inwardly after the indents 24 are partially formed. This two-stage forming operation is accomplished in this particular machine by making the convex forming tools 128 thicker than the flat nosed forming tools 130. This automatically introduces a dwell period between the time that the convex forming tools 128 engage the tube blank and partially form the indents 24 and the time that the flat nosed forming tools 130 engage the lands 25.

The machine 100 operates as follows. A handling mechanism (not shown) feeds a tube blank over the cam die assembly 103 and down part way into the assembly onto the ejector sleeve 110 which is in a raised position (not shown) at the time. At the time, the outer ram 104 is also in a raised position (not shown) and the inner ram 108 is in a lowered position (not shown) in the guide 109.

After the tube blank is loaded, the outer and inner rams 104 and 108 descend in unison. The upper die 118 enters the upper end of the tube blank and the clamp sleeve 112 engages the top of tube blank 20. The rods 105 then engage and depress the cushion plate (not shown) allowing the clamp sleeve 112 to push the tube blank down over the lower and middle dies 114 and 116 as the ejector sleeve 110 and push pin 111 recede with the cushion plate.

When the ejector sleeve 110 bottoms out and the upper die 118 engages the middle die 116 as shown in FIG. 12, the outer ram 104 continues to descend as the inner ram 108 recedes in the housing 109. The cam drivers 124 attached to the outer ram 104 then simultaneously drive the six cams 120 inwardly. The convex forming tools 128 engage and center the tube blank and then partially form the indents 24. As the cams 120 with the convex forming tools 128 near the inner ends of their stroke, the flat nosed tools 130 engage the partially indented tube. As the outer ram 104 completes its stroke, the convex forming tools 128 complete formation of the indents 24 against the central mandrel while the flat nosed tools 130 simultaneously push the lands 25 radially inwardly. FIGS. 12 and 13 show the end of the forming stroke where the outer ram head 104 is its lowest position, the cams 120 are at their innermost position and the forming tools 128 and 130 have completely formed the indented blank 22 in cooperation with the dies 114, 116 and 118 of the central mandrel.

After the indented blank 22 is formed, the rams 104 and 108 are raised and the indented blank 22 is lifted out of the cam die assembly 103 by the ejector sleeve 110 to a position where it is picked and taken out of the press up by the handling mechanism (not shown).

We wish it to be understood that we do not desire to be limited to the exact details of construction shown and described, for obvious modifications will occur to a person skilled in the art.

The embodiments of the invention in which an exclusive property or privilege is claimed are defined as follows:

1. A method of manufacturing a housing for a tri-pot universal joint comprising the steps of:
   providing a predetermined length of thick walled tube,
   forming the middle of the thick walled tube so as to produce a tri-lobal middle section and irregular end portions which remain sufficiently intact to machine a circular band at each end of the tube,
   machining one end portion of the formed tube to provide a circular band at one end of the formed tube,
   broaching the lobes of the tri-lobal section in the middle of the formed tube to provide three internal, curved drive tracks which are shaped to radially capture curved drive rollers, and
   machining an opposite end portion of the formed tube to provide a circular band at the opposite end of the formed tube.

2. A method of manufacturing a housing for a tri-pot universal joint comprising the steps of:
   providing a predetermined length of thick walled tube,
   cold forming the middle of the thick walled tube into a tri-lobal section by an indenting operation which produces irregular end portions which remain sufficiently intact to provide a circular band at each end by machining operations,
   machining one end portion of the cold formed tube to provide a circular band at one end of the cold formed tube, broaching the lobes of the tri-lobal section in the middle of the cold formed tube to provide three internal drive tracks having centerlines and curved side walls which extend radially inwardly of the centerlines, and machining an opposite end portion of the cold formed tube to provide a circular band at the opposite end of the formed tube.

3. A method of manufacturing a housing for a tri-pot universal joint comprising the steps of:

providing a predetermined length of thick walled tube, cold forming three circumferentially spaced indented portions in the middle of the tube to provide a tri-lobal middle section and irregular end portions which remain sufficiently intact to provide a circular band at each end by machining operations, said tube being cold formed so as to include three circumferentially spaced straight lands which are midway between the indented portions and which extend to one end of the cold formed tube and provide three flat coplanar surfaces on an end face of the cold formed tube, machining an opposite end portion of the cold formed tube to provide a flat annular end face and a circular band at the opposite end of the cold formed tube, broaching the lobes of the tri-lobal section in the middle of the cold formed tube to provide three internal drive tracks having centerlines and curved side walls which extend radially inwardly of the centerlines, and machining the one end portion of the cold formed tube to provide a circular band at the one end of the formed tube.

4. A method of manufacturing a housing for a tri-pot universal joint comprising the steps of:

providing a predetermined length of thick walled tube, cold forming three circumferentially spaced indented portions in the middle of the thick walled tube and then continuing cold forming the indented portions while simultaneously pushing the tube inwardly along its entire length at three circumferentially spaced lands which pass between the indented portions to provide a tri-lobal middle section and irregular end portions which have sufficient material for machining a circular band at each end of the cold formed tube, said tube being formed so that the three circumferentially spaced lands remain straight and provide three spaced flat coplanar surfaces on each end face of the cold formed tube, machining one end portion of the cold formed tube to provide a flat annular end face and a circular band at the one end of the cold formed tube, broaching the lobes of the tri-lobal section in the middle of the cold formed tube to provide three internal drive tracks having centerlines and curved side walls which extend radially inwardly of the centerlines, and machining an opposite end portion of the cold formed tube to provide a flat annular end face and a circular band at the opposite end of the formed tube, one of said circular bands being machined in the form of an axial circular lip.

* * * * *